United States Patent
Spatafora et al.

[11] Patent Number: 6,098,379
[45] Date of Patent: Aug. 8, 2000

[54] SYSTEM FOR THE PACKAGING OF PRODUCTS

[75] Inventors: Mario Spatafora, Bologna; Roberto Ghiotti, Calderino di Monte San Pietro, both of Italy

[73] Assignee: Azionaria Costruzioni Macchine Automatiche A.C.M.A. S.P.A., Bologna, Italy

[21] Appl. No.: 09/055,351

[22] Filed: Apr. 6, 1998

[30] Foreign Application Priority Data

Apr. 8, 1997 [IT] Italy ................................. BO97A0202

[51] Int. Cl.[7] ................................................... B65B 35/30
[52] U.S. Cl. ............................................ 53/448; 414/788.9
[58] Field of Search .............................. 53/543, 202, 531, 53/534, 535; 414/788.9; 198/778, 465.1, 347.3

[56] References Cited

U.S. PATENT DOCUMENTS 1,342,189   6/1920   Stowe .
4,120,662  10/1978   Fosslien ................................. 73/425.6
4,251,979   2/1981   Horgiome et al. ........................ 53/543
4,578,926   4/1986   Sato et al. ................................. 53/502
4,907,398   3/1990   Holze et al. ............................... 53/443
4,946,340   8/1990   Murphy et al. ...................... 414/788.8
5,320,210   6/1994   Van Den Bergh etal. ........... 198/465.1
5,680,923  10/1997   Gram ...................................... 198/778
5,863,177   1/1999   Carson et al. ....................... 414/798.9

FOREIGN PATENT DOCUMENTS 411 411   2/1991   European Pat. Off. .

Primary Examiner—Joseph J. Hail, III
Assistant Examiner—Dermott J. Cooke
Attorney, Agent, or Firm—Pillsbury Madison & Sutro

[57] ABSTRACT

The system for the packaging of products comprises a first conveyor on which a plurality of trays are fed along a defined conveying line so as to transfer the products on the trays from a production unit to a plurality of product packaging lines, and an aligner designed to transfer the products from the conveying line to the packaging lines, at each of which there is a buffer designed to accommodate a plurality of trays.

15 Claims, 3 Drawing Sheets

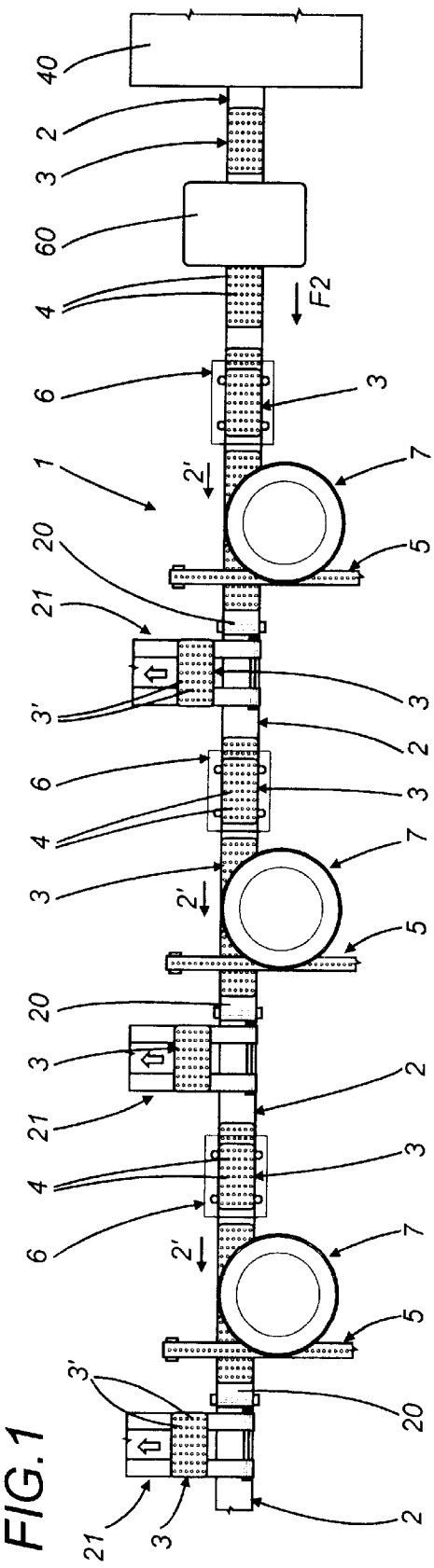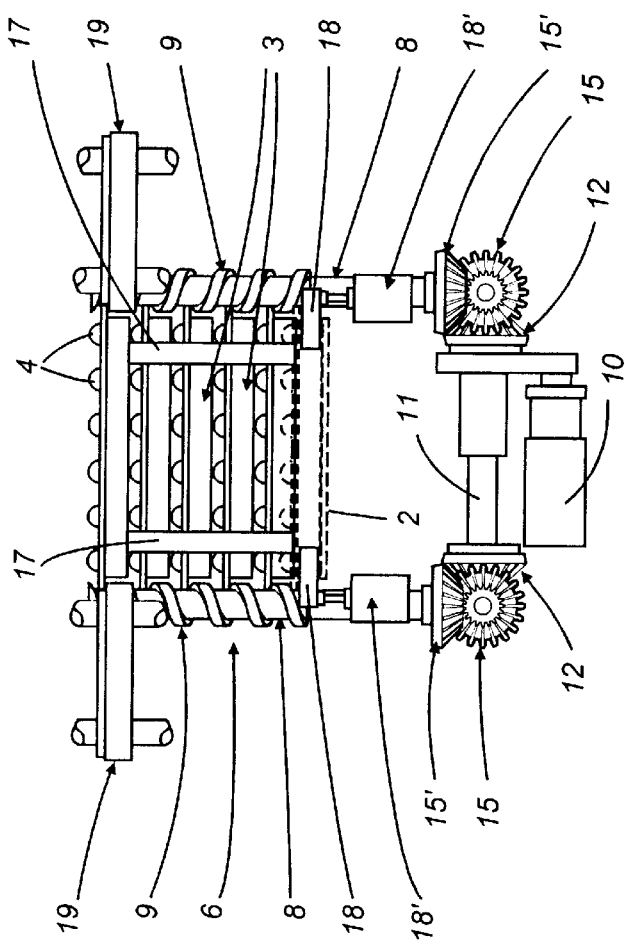

SYSTEM FOR THE PACKAGING OF PRODUCTS

BACKGROUND OF THE INVENTION

The present invention relates to a system for the packaging of products.

The present invention can be used to good advantage in the food packaging industry where the food products are placed on trays. The description which follows refers to this particular field of application but without thereby restricting the scope of the inventive concept.

In the packaging of food products, such as biscuits or chocolates, the products feeding out of the production units are placed directly on trays carried by a belt conveyor which feeds the trays themselves along a conveying line to a series of parallel packaging lines downstream. In most cases, between the production unit and the packaging lines there is a single buffer forming an intermediate storage unit for a plurality of trays which can be returned to the packaging lines.

The main disadvantages of known packaging systems of this kind are due to the fact that, if one of the packaging lines temporarily stops for any reason, the tray buffer feed cycle must be adjusted because the flow of trays feeding out of the buffer itself must be slowed down to take into account the smaller number of packaging lines still in operation downstream of the buffer along said conveying line.

Adjusting the feed cycle of the buffer is not only difficult to carry out with sufficient accuracy and promptness but may also have negative effects on the production process, for example, if the only buffer connected with the packaging lines is temporarily full, thus making it necessary to reduce the output of the machines which make the products in order to decrease the number of trays feeding out of them. All this has serious consequences for the operation of the entire system and for its production costs.

This problem may become even more serious if the stoppage involves more than one packaging line at the same time.

The aim of the present invention is to provide a product packaging system that is not affected by the problems described above.

SUMMARY OF THE INVENTION

The present invention discloses a system for the packaging of products comprising at least one first conveyor to carry the products on trays along a conveying line from a production unit to at least one product packaging line, and aligning means designed to transfer the products from the trays to the packaging line, characterized in that the packaging line is equipped with a buffer for the storage of the trays.

In particular, the system comprises a plurality of packaging lines, each equipped with a buffer.

BRIEF DESCRIPTION OF THE DRAWINGS

The invention will now be described with reference to the accompanying drawings which illustrate preferred embodiments of the invention and in which:

FIG. 1 is a schematic plan view, with some parts cut away, of the system made according to the invention;

FIG. 3 is a schematic enlarged front view of a detail from FIG. 2;

DESCRIPTION OF THE PREFERRED EMBODIMENTS

Figure 2:
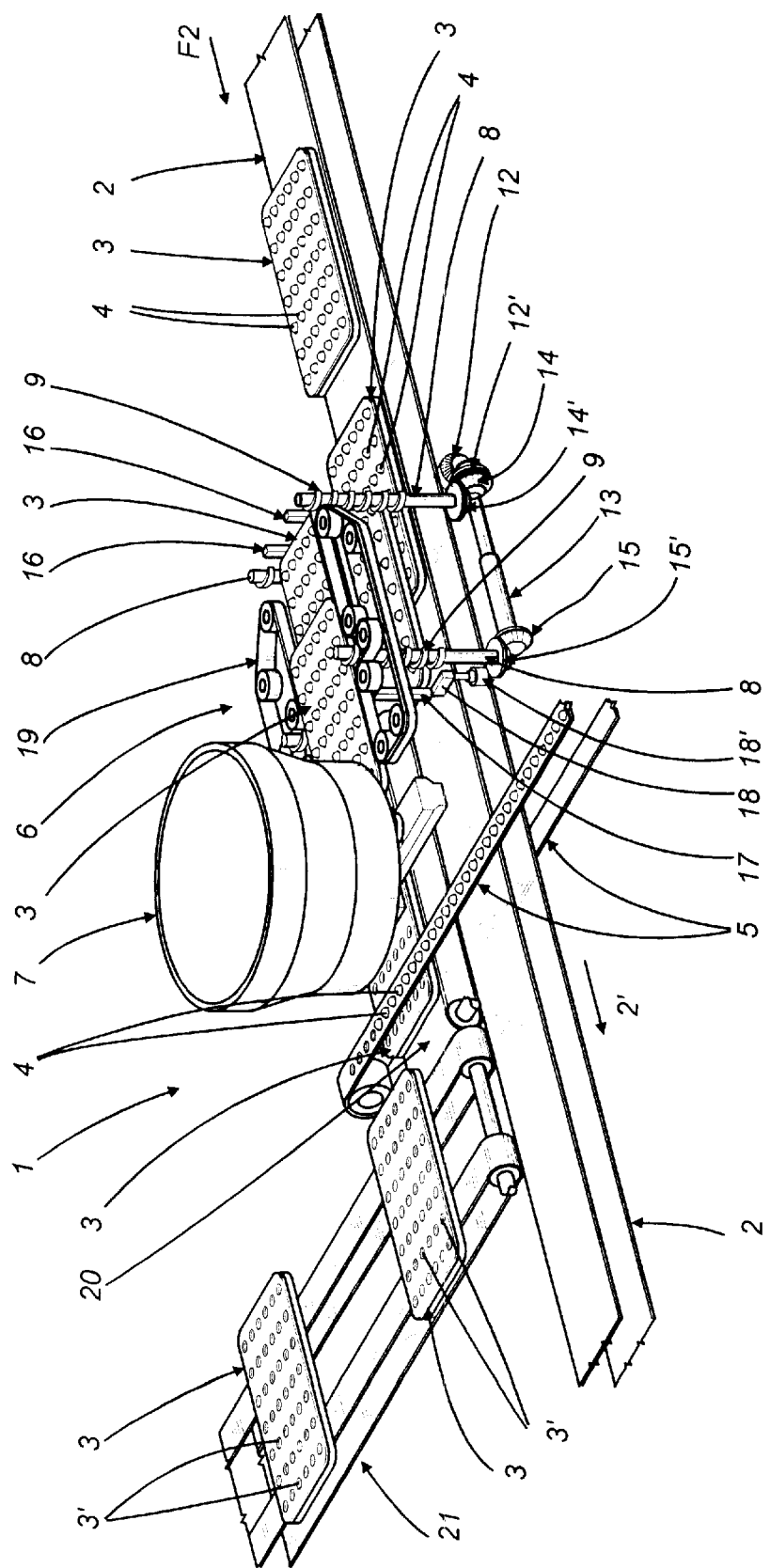
FIG. 2 is a schematic enlarged perspective view, with some parts cut away, of the preferred embodiment of the system illustrated in FIG. 1.

With reference to FIG. 1, the numeral 1 indicates as a whole a system for the packaging of food products 4 comprising a first conveyor 2 on which a plurality of trays 3 are fed along a conveying direction 2' of the conveyor 2 from a production unit 40, which makes the products 4, to a plurality of packaging lines 5 operating in parallel, only three of which are illustrated in FIG. 1.

In the embodiment described here, the products 4 are biscuits, chocolates or similar products which do not have any surface that is flat enough to allow them to assume a stable transfer position. For this reason, the use of trays 3 with hollows 3 for the stable support and positioning of the products is essential to guarantee the stable transfer of the products along the entire system 1.

The products 4 are arranged on the trays 3 in a plurality of lines extending in parallel with the conveying direction 2' of the first conveyor 2. Although the products 4 illustrated in the accompanying drawings are substantially spherical in shape, they could be ovoid, polyhedral or any other shape.

Figure 4:
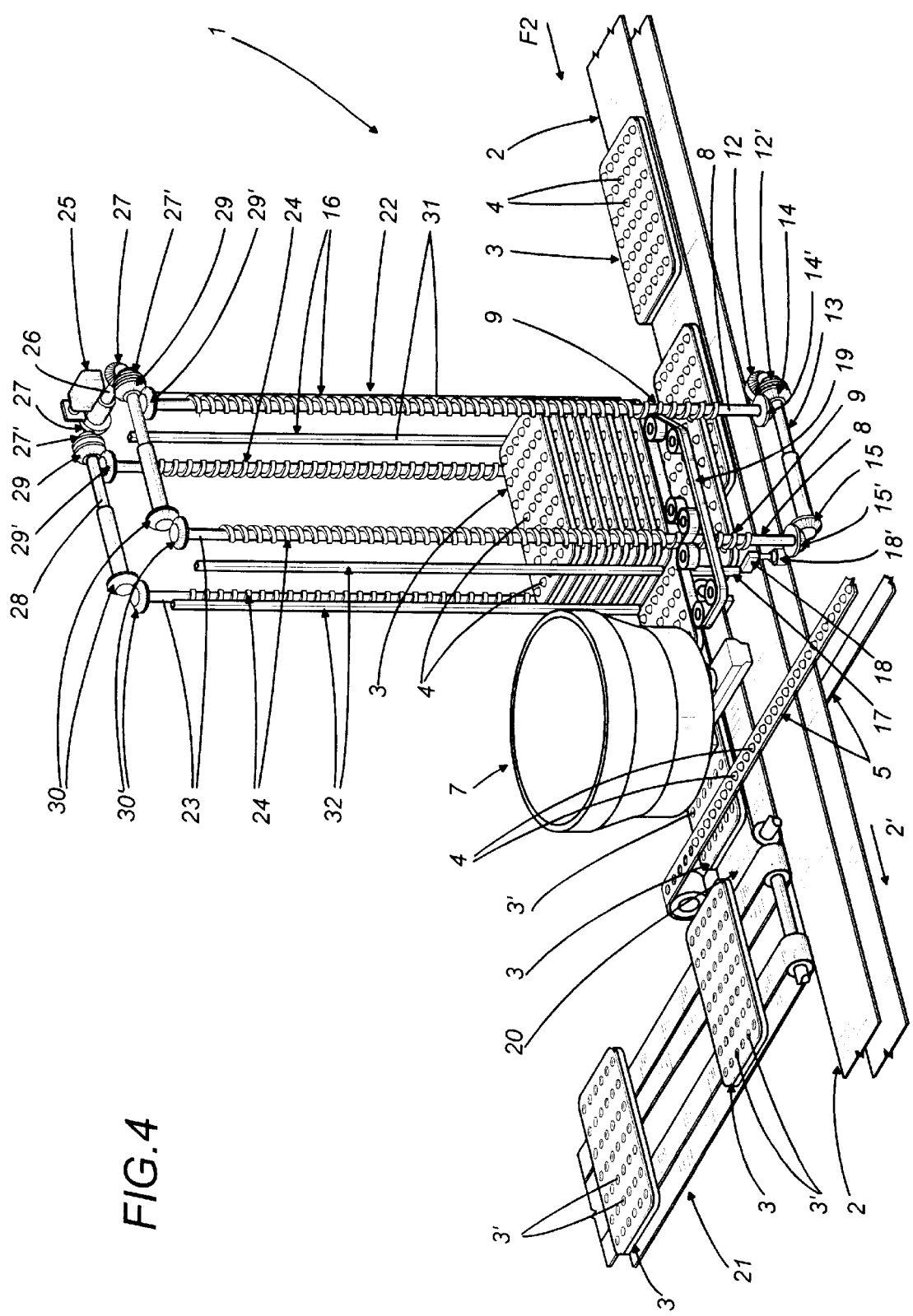
FIG. 4 is a schematic enlarged perspective view, with some parts cut away, of another embodiment of the system illustrated in FIG. 1.

As shown in FIGS. 1, 2 and 4, there is a buffer 6 operating next to each packaging line 5.

Each buffer 6 is located above the first conveyor 2 and is designed to pick up the trays 3 from the conveyor 2, arrange them in an ordered stack and transfer them to an aligner 7 which cyclically picks the products 4 from the trays 3 and places them on the packaging line 5.

The aligner 7 may be of the type described in U.S. application Ser. No. 09/055,333, filed on Apr. 6, 1998.

In the embodiment illustrated in FIGS. 2 and 3, each buffer 6 comprises first pickup means 8, 9 consisting of four columns 8 at the corners of a rectangle on opposite sides of the first conveyor 2. A part of the outer surface of each column 8 has a protrusion 9 shaped like a cylindrical helix and constituting a screw feed means designed to engage a part of an edge of each tray 3 substantially parallel with the direction 2' in which the tray 3 itself is conveyed by the first conveyor 2. The four columns 8 rotate about their longitudinal axes, driven by a first motor 10 which drives a first drive shaft 11 placed crossways underneath the conveyor 2. The first drive shaft 11 drives a pair of first transmission shafts 13, only one of which is illustrated in FIG. 2, through corresponding bevel gear pairs 12, 12'. Each first transmission shaft 13 is located underneath a pair of columns 8 on the same side of the first conveyor 2 and rotates the columns through corresponding bevel gear pairs 14, 14' and 15, 15'.

Two pairs of uprights 16, 17 are arranged above the conveying line 2 in such a way as to define an area to contain the trays 3 in the buffer 6.

The first pair of uprights 16 is located upstream of the columns 8, relative to the direction of feed F2 of the trays 3 on the first conveyor 2, whilst the second pair of uprights 17 is located downstream of the columns 8.

The second pair of uprights 17 is lower in height than the first pair of uprights 16, so as to enable the trays 3 to leave the buffer 6.

At the lower end of each upright 17 of said pair of uprights, there is a stop element 18, driven by a motor 18', the latter moving the stop element 18 from a working position (illustrated in FIGS. 3 and 4) in which it intercepts a tray 3 and prevents the tray 3 from moving further along the conveying line 2', and an inoperative position (not illustrated) in which it does not interfere with the feed motion of the tray 3 along the conveyor 2.

At the top of the buffer 6, there are two motor-driven belts 19, opposite each other, closed in a loop and designed to press against a pair of opposite edges of a tray 3, parallel to the conveying direction 2' so as to draw the trays 3 out of the buffer 6 and place them on a second, auxiliary conveyor 20, illustrated in FIGS. 2 and 4, which carries the trays 3 towards the aligner 7. Once the aligner 7 has removed all the products 4 from the tray 3, the tray 3 is conveyed to an empty tray 3 discharging line 21.

In the embodiment of the system 1 illustrated in FIG. 4, the buffer 6 also has a storage unit 22 which enables the buffer 6 to accumulate a larger number of trays 3.

The storage unit 22 in turn comprises second pickup means 23 and 24 consisting of another four columns 23, lying on the extensions of the columns 8 but separate from them. A part of the outer surface of each column 23 has a protrusion 24 shaped like a cylindrical helix and constituting a screw feed means designed to engage a part of an edge of each tray 3 parallel with the direction 2' in which the tray 3 itself is conveyed by the first conveyor 2. The direction of the cylindrical helix forming the protrusion 24 is preferably opposite that of the corresponding protrusion 9 on the columns 8. When the system is in use, the four columns 23 are rotated about their longitudinal axes by a second motor 25, which drives a second drive shaft 26 arranged crossways above the conveying line 2'. The second drive shaft 26 drives a pair of second transmission shafts 28 through corresponding bevel gear pairs 27, 27'. Each second transmission shaft 28 is located above a pair of columns 23 on the same side of the conveying line 2' and rotates the columns about their longitudinal axes through corresponding bevel gear pairs 29, 29' and 30, 30'.

Another two pairs of uprights 31, 32, lying on the extensions of the pairs of uprights 16 and 17 of the buffer 6 but separate from these, define an area to contain the trays 3 in the storage unit 22.

When the system is in use, the trays 3 containing the products 4 to be packaged coming, for example, from a production unit 40, are carried by the first conveyor 2 along the conveying line 2' to the packaging lines 5 to which the products 4 in the trays 3 must be distributed.

When a tray 3 reaches the buffer 6 connected to the corresponding packaging line 5 and the front edge of the tray 3 comes into contact with the stop elements 18, the stop elements 18 are rotated to the working position to prevent the tray 3 from continuing its forward movement. At this point, the motor 10 starts and rotates the columns 8, whose helical protrusions 9 engage a pair of opposite edges of the tray 3 so as to lift it off the first conveyor 2.

If the packaging line 5 is working and ready to receive the products 4 to be packaged, the tray 3 is lifted by the columns 8 to the level of the motor-driven belts 19 and the latter, by being pushed against the edges of the tray 3 parallel to the direction of feed, pull the tray 3 out of the buffer 6 and transfer it to the auxiliary conveyor 20 which carries the tray 3 to the corresponding aligner 7 which removes the products 4 from the tray and transfers them to the packaging line 5.

If the packaging line 5 is temporarily inoperative, the trays 3 from the first conveyor 2 are temporarily stacked in the buffer 6 until the packaging line 5 starts working again and the trays 3 can be drawn from the stack and transferred to the corresponding aligner 7.

If the buffer fills up completely, the corresponding stop elements 18 are rotated to the rest position so as to allow the trays 3 to continue moving along the conveyor 2 towards the next buffer 6 on the conveying line 2'.

In the embodiment illustrated in FIG. 4, the system is equipped with a storage unit 22 which, being capable of temporarily storing many more trays 3 than the buffer 6 made in accordance with the embodiment illustrated in FIGS. 2 and 3, makes it possible for production to continue even when the packaging line 5 stops for a prolonged period of time. When the buffer 6 is full, the columns 23 start rotating so as to transfer to the storage unit 22 the tray 3 at the top of the stack in the buffer 6, thus enabling the latter to receive another tray 3. The cycle is repeated every time the above conditions arise.

The fact that the trays 3 can be temporarily stored in the buffer 6 and in the related storage units 22 makes it possible to deal with periods of inactivity of the packaging lines 5 without changing the flow of trays from the production unit 40, along the first conveyor 2 and, thus, without adjusting the flow of trays 3 feeding out of the production unit 40. That means the rate of production can be kept constant and is unaffected by the temporary stoppage of one or more packaging lines 5. Even in cases, as illustrated in FIG. 1, where the system is equipped with a main buffer 60 located downstream of the production unit 40, the tray 3 feed cycle does not need to be adjusted in any way.

What is claimed:

1. A system for the packaging of products comprising a plurality of packaging lines, at least one first conveyor to carry the products on individual trays along a conveying line from a production unit to said product packaging lines, the individual trays being individually disposed in succession along the conveying line, aligning means for transferring the products from the individual trays to the packaging lines, and a plurality of buffers for the storage of the individual trays, wherein each of said buffers is disposed between said first conveyor and a respective one of said packaging lines for transferring the products to the respective one of said packaging lines, and each said buffer comprises a stop element movable between a working position for preventing an individual tray on said conveying line from moving along said first conveyor past said buffer and an inoperative position for not interfering with movement of the individual trays along said conveying line.

2. The system according to claim 1, wherein each buffer is located on the conveying line near the packaging line it is connected to.

3. The system according to claim 2 wherein each buffer is located upstream of the packaging line it is connected to, relative to the direction of feed of the trays along the conveying line.

4. The system according to claim 1 wherein there is a main buffer located between the production unit of the products and the plurality of packaging lines.

5. The system according to claim 1 wherein the buffers comprise first pickup means designed to pick the trays up from a first position in which they are on the first conveyor and to transfer them to a second position which is a defined distance away from the conveying line.

6. The system according to claim 5 wherein the second position is above the first position.

7. The system according to claim 6 wherein the first pickup means consist of screw means designed to engage parts of opposite edges of the trays.

8. The system according to claim 7 wherein the screw means extend between the conveying line and the second position.

9. The system according to claim 5 further comprising a plurality of second conveying means each disposed for carrying the trays from the second position associated with a respective buffer to an unloading position in proximity to the aligning means so as to enable the products to be picked up and positioned on a respective packaging line.

10. The system according to claim 9 wherein each of the second conveying means comprises a pair of motor-driven belts acting on corresponding pairs of opposite edges of the trays so as to transfer the latter from the second position to the second conveying means.

11. The system according to claim 5 wherein the buffer comprises a storage unit the infeed of which is located at the second position.

12. The system according to claim 11 wherein the storage unit comprises second pickup means.

13. The system according to claim 12 wherein the second pickup means consist of screw means located between the second position and a position above the second position.

14. A system for the packaging of products comprising at least one conveyor to carry the products on individual trays along a conveying line from a production unit to at least one product packaging line, the trays being individually disposed in succession along the conveying line, aligning means for transferring the products from the individual trays to the packaging line, and a buffer operatively associated with the packaging line for the storage of the trays, wherein said buffer comprises a screw type pickup means for individually picking the individual trays up from the first conveying line and transferring the individual trays to a storage position which is a defined distance away from the conveying line, and wherein said system further comprises second conveying means for carrying the individual trays from the storage position to the aligning means so as to enable the products to be picked up and positioned on the packaging line.

15. A system for the packaging of products as defined in claim 14 wherein each said buffer comprises a stop element movable between a working position for preventing an individual tray on said conveying line from moving along said at least one conveyor past said buffer and an inoperative position for not interfering with movement of the individual trays along said conveying line.

* * * * *